May 19, 1953
E. A. POOL
2,638,636
SHOPPING ESTABLISHMENT
Filed Jan. 31, 1951
2 Sheets-Sheet 1
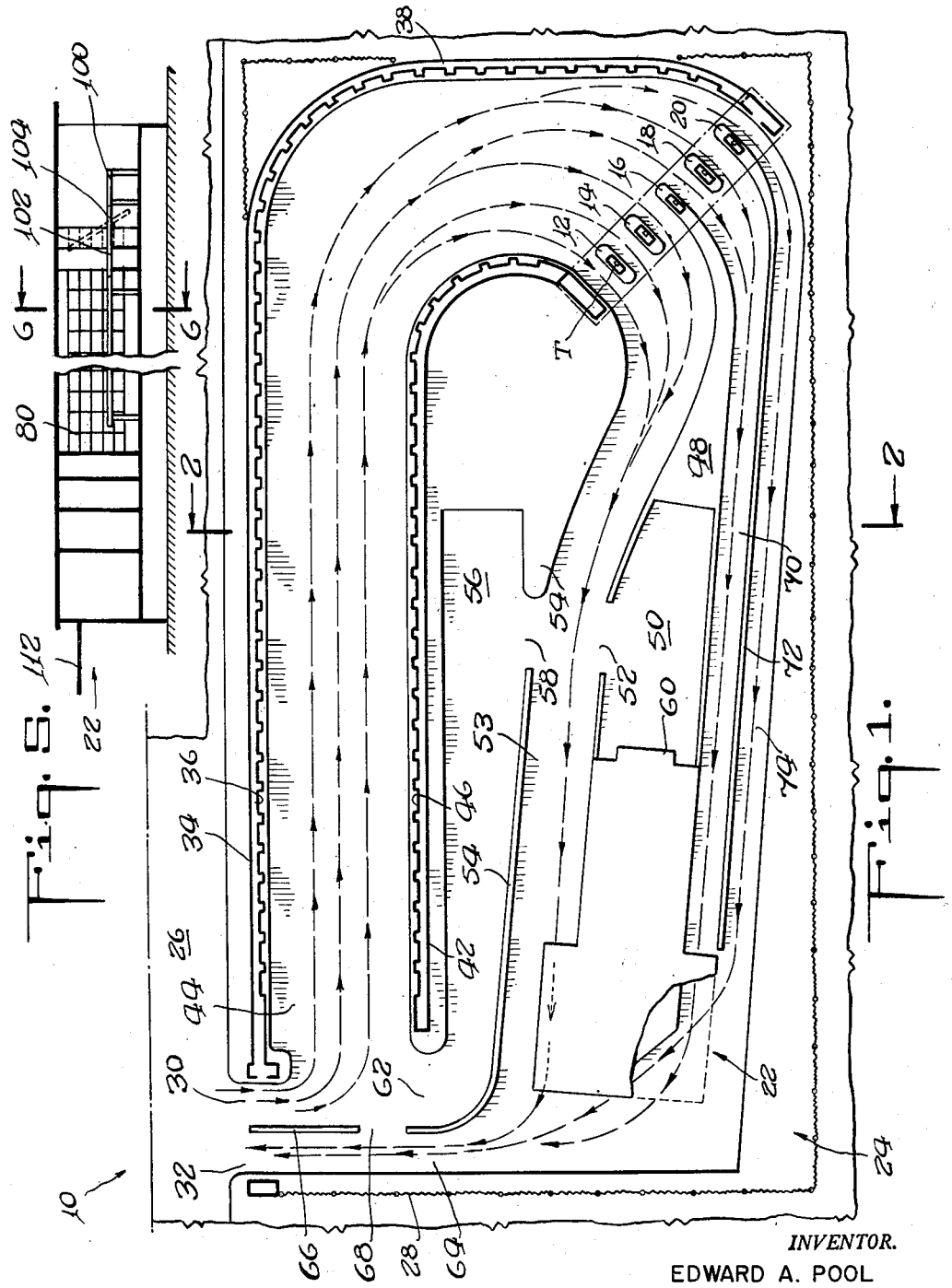
INVENTOR.
EDWARD A. POOL
BY
ATTORNEY

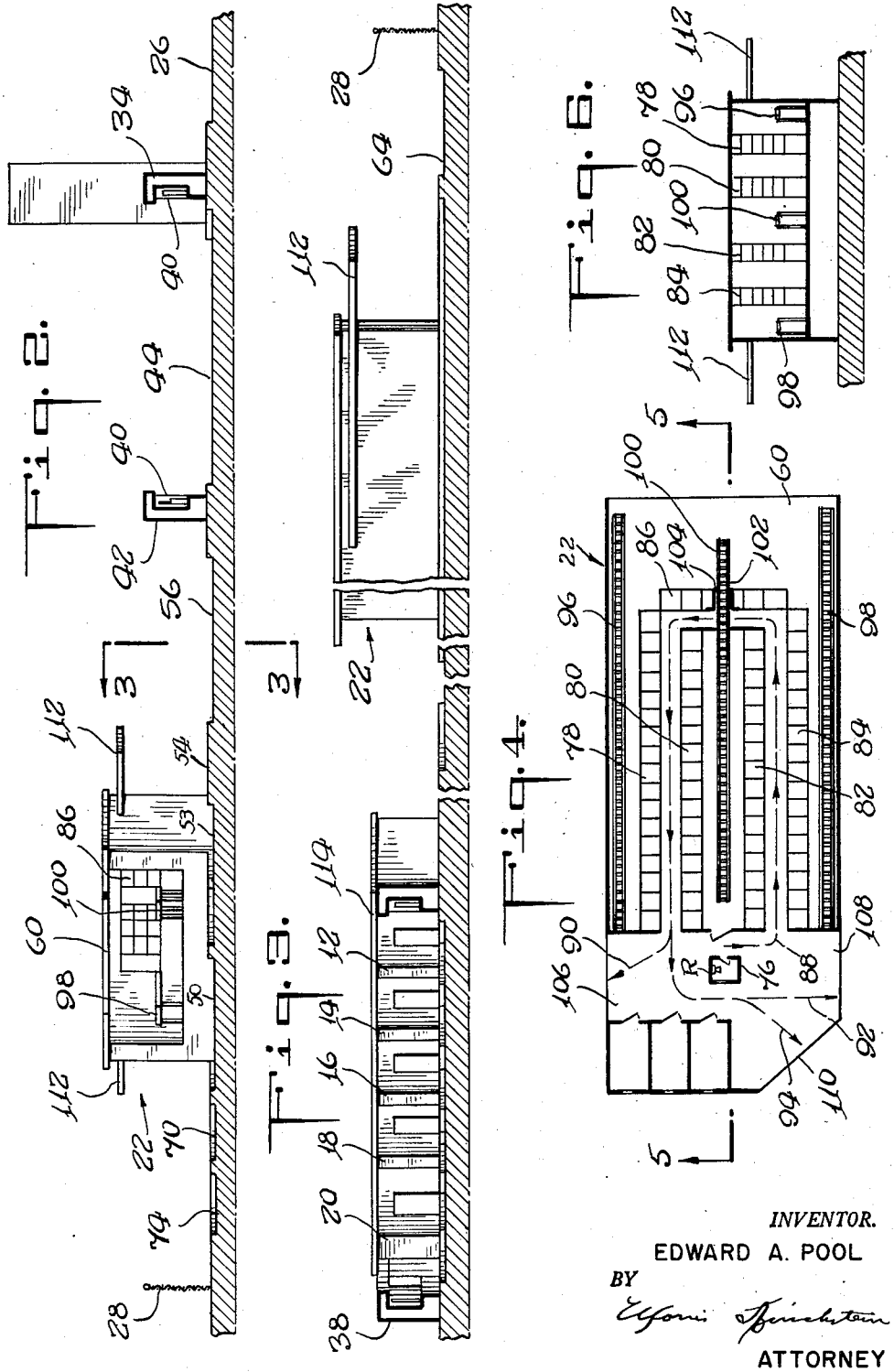

UNITED STATES PATENT OFFICE 2,638,636

SHOPPING ESTABLISHMENT

Edward A. Pool, New York, N. Y.

Application January 31, 1951, Serial No. 208,802

1 Claim. (Cl. 20—1.6)

This invention relates to shopping establishments and, more particularly, is concerned with shopping establishments of the type wherein a shopper can remain in his automobile throughout the sales transaction.

It is an object of my invention to provide an establishment of the character described which saves a shopper the annoyance of getting dressed up, and the effort and possible damage of parking his car, possibly at some distance from the marketing place. In a city store this may mean a walk of several blocks, plus a parking charge; in a suburban super-market it may mean a walk of hundreds of feet from the car and, laden with groceries, back to the car.

It is another object of my invention to provide an establishment of the character described which eliminates the distasteful effort of trudging through the store itself while looking for wanted items, pushing an unwieldy cart for self service.

It is another object of my invention to provide an establishment of the character described which eliminates the bottle-neck at the cash register that forces people to wait while those in front take the purchases from their carts, have them weighed, tallied, rung-up, paid for and packed.

It is another object of my invention to provide an establishment of the character described which permits a housewife to take her children with her—out of mischief—if she must take them on her shopping trip.

It is another object of my invention to provide an establishment of the character described which enables the shopper to keep dry and comfortable in inclement weather.

It is another object of my invention to provide an establishment of the character described which eliminates the necessity of a shopper carrying the groceries to the car, or even touching them until arrival at home. Canned goods, beverages and the like are heavy. Cereals, soap flakes, etc., are bulky.

It is another object of my invention to provide an establishment of the character described which provides a most convenient way of selecting desired groceries—in fact, provides a choice of methods, of which any or all can be used by the same shopper on the same trip. Thus, a shopper can make selections at home in leisure and comfort from weekly advertisements that may appear in the shape of "order forms," provided with a space to check off, from a long and varied list of items, those which are chosen. The shopper also can make selections at home on an order form provided for that purpose each time a purchase is made at the shopping establishment. At the shopping establishment itself the shopper may be offered an order form at the entrance. This form can be studied and checked off immediately, or the shopper may defer selection until various items displayed along a vehicular path leading up to an order booth have been examined to aid the shopper in selecting the day's best buys at the order booth itself. The shopper still has another opportunity to make a selection which may be given orally. In fact, many shoppers, with only a few items in mind, may carry out the entire transaction orally at the order booth.

It is another object of my invention to provide an establishment of the character described whose building costs, equipment, architectural costs, fixtures and decorations are considerably less expensive than for conventional types of retail food stores.

It is another object of my invention to provide an establishment of the character described which contains and needs far less cubic space per dollar of merchandise than a conventional type food outlet, because aisle areas for customers are eliminated, and because no expensive fixtures such as tiled flooring, porcelain enamel, chrome trim, glass, etc. are needed.

It is another object of my invention to provide an establishment of the character described which does not need air conditioning—a necessity for food outlets today, and which does not present the same heating problems and cost as the larger structures with which it competes.

It is another object of my invention to provide a shopping establishment of the character described which, although requiring approximately the same land area as a comparable food outlet with adequate parking facilities, can be built on less expensive land in outlying sections and back street areas, inasmuch as it does not cater to a "walking" trade, and hence need not be located within walking distance of residential areas.

It is another object of my invention to provide a shopping establishment of the character described which requires less personnel than a comparable present day food outlet, and which can be operated with less skilled labor.

It is another object of my invention to provide a shopping establishment of the character described whose novel and efficient operation depends upon the relative positions of the different parts of the establishment rather than upon elaborate and intricate mechanisms.

Other objects of my invention in part will be obvious, and in part will be pointed out hereinafter.

My invention accordingly consists in the features of construction, combinations of elements and arrangements of parts which will be exemplified in the establishment hereinafter described, and of which the scope of application will be indicated in the appended claim.

In the accompanying drawings, in which is shown one of the various possible embodiments of my invention, Fig. 1 is a plan view of a shopping establishment constructed in accordance with my invention, the tops of certain structures being removed in whole or in part;

Fig. 2 is a sectional view through said establishment, the same being taken substantially along the line 2—2 of Fig. 1;

Fig. 3 is a sectional view taken substantially along the line 3—3 of Fig. 2, the same showing the display booths and the order-selection and delivery building;

Fig. 4 is a plan view of the order-selection and delivery building with its roof removed;

Fig. 5 is a fragmentary longitudinal sectional view through the order-selection and delivery building, the same being taken substantially along the line 5—5 of Fig. 4; and Fig. 6 is a transverse sectional view through said building, the same being taken substantially along the line 6—6 of Fig. 5.

Referring now in detail to the drawings, the reference numeral 10 denotes a shopping establishment embodying my invention. Said establishment includes a plurality of order-cashier booths 12, 14, 16, 18, 20, an order-selection and delivery building 22, said booths and building being remote from one another, and a means for rapidly conveying intelligence from the booths to the building.

More specifically, the establishment 10 includes a preferably elongated area 24 desirably located alongside a road 26. Said area is of substantial size and advantageously is located in a section removed from the main shopping section of a locality, away from any highly built up and highly populated sites, so that inexpensive property can be employed. The area is enclosed in the main by a wire fence or the like 28, to prevent ingress or egress except through an entrance 30 and an exit 32 facing the road 26.

The road side of the area 24 is bounded by a wall 34, provided with a series of closely spaced niches 36 facing the inside of the enclosure. Said wall starts at the entrance 30, runs along the road side of the area and then along the short side 38 of the area to terminate adjacent the outermost order-cashier booth 20. Desirably said wall is lined over its entire length with the aforesaid niches, the same being at a height convenient for observation. Said niches, accordingly, have their center at about the eye level of a shopper in a car. The niches are deeper than it is customary to set back a billboard display from its frame. In other words, the depth of the niches is in the order of from one to three feet, so that said niches can serve as showcases to display food products three dimensionally in an attractive manner to shoppers. The front of each niche is covered with a pane of glass 40, which will keep the display clean and appealing.

A second wall 42 is provided, which is spaced from the wall 34 and runs substantially parallel thereto, whereby to define an automobile driveway 44 of approximately J-shape running from the entrance 30 to the series of order-cashier booths. This driveway is suitably paved to accommodate a heavy flow of slow moving vehicular traffic, as, for example, with macadam, crushed stone or concrete. The side of the wall 42 facing the automobile driveway 44 is lined with niches 46 of the same character as the niches 36.

It will be noted that, with this arrangement, the order-cashier booths are disposed across the tip of the short leg of the J adjacent the corner of the area 24, diagonally opposite to that at which the entrance 30 and exit 32 are located.

The order-selection and delivery building 22 is placed adjacent another corner of the area 24, this being the corner nearest the exit and entrance.

A raised area or curb 48 runs from the center booth 16 to the adjacent receiving end of the building 22, said area widening as it approaches the building in order to divert traffic into paths on opposite sides of the building. A portion 50 of this area is depressed and paved near the building, and a section on the road side thereof is omitted to provide an opening 52 for access of supply trucks to the portion 50.

It thus will be seen that an automobile driveway 53 is formed from between the booths 12, 14, 16 to the road side of the building 22. This driveway is paved and has its side nearest the wall 42 defined by a curb 54. Said curb is spaced from the wall 42 to provide a yard 56 which is designed to permit parking of supply trucks. Access to said yard is obtained through an opening 58 in the curb 54, this opening 58 being registered with the opening 52, so that supply trucks readily can be driven across the driveway 53 through the opening 52 and into the portion 50, where merchandise from the trucks is discharged into the receiving end 60 of the building 22. Access also is had to the parking yard 56 through an entrance 62 between the end of the wall 42 and the end of the curb 54 nearest the exit and entrance.

This end of the curb 54 is spaced from the fence 28 to define a paved exit path 64 from the delivery end 65 of the building 22 to the exit 32. Another curb 66 in line with the aforementioned end of the curb 54 separates the exit and entrance. Said curb 66 is spaced from the curb 54 to provide a gap 68, through which, if desired, cars leaving the building 22 can reenter the automobile driveway 44.

The lane between booths 16, 18 and the lane between booths 18, 20 lead into a paved automobile driveway 70 which runs from said lanes to the far side of the building 22. The driveway 70 is bounded on one side by the curb 48, and on its other side by a curb 72 running from the booth 20 parallel to the curb 48 and passing the receiving end of the building 22.

Another paved automobile driveway 74 leads from the lane on the outside of the booth 20, i. e., between said booth and the end of the wall 38, to the far corner of the delivery end of the building 22. This driveway has one side defined by the curb 72.

The booths 12—20 provide shelter for cashiers who receive shoppers' order forms. Said booths also house the transmitting ends T of a rapid intelligence-conveying mechanism of any suitable type. This mechanism, for example, may constitute a wire communication system including a microphone in each booth, a suitable communication network extending from the booths to the building, a receiver R located in a cage 76 near the delivery end of the building, an amplifier and a source of power. Such equipment is of the type now conventionally used for office inter-communication.

An alternative means for rapidly conveying intelligence between the booths and the building constitutes a pneumatic transport system including tube circuits between the booths and the building, the same having conventional reception and delivery stations.

Still another type of apparatus for rapid transmission of intelligence between the booths and the building includes key operated transmitters at the booth and a printing receiver at the building.

The building 22 constitutes a storehouse in which items to be sold are kept in a prearranged order. Thus, as shown, said building is elongated and includes four rows 78, 80, 82, 84 of bins running longitudinally of the building, and spaced from one another a distance sufficient to permit an order pick-up man, pushing a small wheeled cart, to pass between them. The outer rows 78, 84 are slightly longer than the inner rows 80, 82. A fifth transverse row 86 of bins connects the rear ends of the outer rows.

A pick-up upon receiving a transmitted order from the cage 76 starts down a path between an outer and the adjacent inner row of bins, e. g., between the rows of bins 82, 84, as indicated by the arrow 88. As he goes down between these rows he selects items of food on the transmitted order and either carries them, or places them in the cart. The pick-up man then proceeds along the row of bins 86 and goes between the rows of bins 78, 80 continuing to select the proper items of food. By the time he emerges the selection of the order will be completed. The completed order either is taken to the road side of the building at the delivery end as indicated by the arrow 90, or to the far side of the building at the delivery end as indicated by the arrow 92, or to the far corner of the building at the delivery end as indicated by the arrow 94.

All the bins are open at their fronts and backs, at their fronts for picking up of food items therefrom, and at their backs for insertion of food items.

To expedite handling of food items delivered by supply trucks and to be stored in the divers bins, I provide three roller ramps 96, 98, 100. The ramps 96, 98 are located between the outer sides of the outer row of bins 78, 84 and the sides of the building 22, a sufficient space being left between the roller ramps and the outer sides of the bins for an employee to work when transferring food items from a roller ramp to the bins. The third roller ramp 100 is run between the bins 80, 82. Said last named roller ramp extends through a gap in the transverse row of bins 86. The ramps all are inclined from the receiving end to the delivery end of the building.

It thus will be appreciated that food items brought by truck or otherwise can be placed on the rear ends of the ramps from which they will roll down to employees stationed in back of the bins who will take the items off the ramp and transfer them to the proper bins.

The ramp 100 has an intermediate section 102 hinged as at 104 to permit the same to be swung out of its transferring position in which it blocks the path of a pick-up man.

The building is provided with three order filling platforms 106, 108, 110. The order filling platforms 106, 108 are at the road and far sides of the delivery end of the building and the order filling platform 110 is at a cut-off far corner of the delivery end of the building.

The building further is provided with projecting eaves 112 overhanging the automobile driveways 53, 70, 74 where these driveways are alongside the loading platforms, in order to protect shoppers from the elements while receiving merchandise. Likewise, a suitable roof 114 spans the tops of the booths 12—20 to protect shoppers when delivering their orders or paying money to cashiers in the booths.

In the operation of the establishment a shopper drives through the entrance 30 in his automobile. Previous to so doing he may have filled out an order form of shopping list, this having been obtained through the mails, from the newspapers, or when he last shopped at the establishment. He also may obtain such a list from an employee at the entrance. After driving through the entrance the shopper goes past the several window displays in the niches 36, 46 which offer various popular items of food or special buys for the day. The shopper may add such items to his list, or he may fill out the list for the first time, while parked on the automobile driveway 44.

At a booth the shopper hands a filled-out list to a cashier in one of the booths. The cashier also receives money from the shopper for the items on the list, and transmits the contents of the list to the cage 76. At the same time the cashier gives the shopper some characterizing identification, as, for example, stamps a number on the list, or gives the shopper a tag with a characteristic indicia. This serves to identify the shopper and to indicate that the money for a specific list of food items has been paid. Said identification likewise is transmitted to the cage.

An employee at the cage makes a circuit past the bins and picks up all the food items on the list. Said employee delivers these food items to one of the three loading platforms 106, 108, 110, the platform selected depending upon the booth at which the shopper stopped. For example, if the shopper stops at any of the three lanes alongside the booths 12, 14, 16 the various food items on his list will be delivered to the loading platform 106; if the shopper stops at either of the two lanes alongside the booth 18 the various food items will be delivered to the loading platform 108. These two loading platforms and the booths associated therewith are known as the large order booths and platforms, and are used to attend to shoppers who purchase a large number of items, e. g. six or more. The remaining platform 110 and the driveway 74 are known as the express platform and driveway, this being for the convenience of shoppers who purchase smaller numbers of items.

When the shopper reaches the proper platform he gives the employee his identification and receives the merchandise which is loaded in his car. Thereafter the shopper drives down the driveway 64 and out the exit 32.

It will be observed that the automobile driveways 53, 70 and 74 are quite long. Pursuant to my invention these driveways, which provide fixed vehicular routes from the order-cashier booths directly to the loading platforms, are made as long as possible under the circumstances. A typical driveway is about two hundred feet long, plus approximately eighty to a hundred feet additional for the length of a building.

Many advantages arise from the presence of these long driveways. For example, during a busy period the driveways keep the employees at the order-cashier booths and in the building continuously busy. Without these long driveways an employee working at a specific loading zone would be idle while the order-cashier for that zone was listing the order, taking money, making change and transmitting the order. Thereafter the order-cashier for the zone would be idle while the order was being assembled. However, by using a long automobile driveway one order can be assembled at the same time that another order is being taken by the order-cashier. Further, the driveways are sufficiently long to enable several cars to wait in line at the loading zone associated with one or more booths so that during such hours no employee needs to stand by idly. Thus these driveways function to even out irregularities in taking and assembling orders in a manner analogous to evening out of pressure in the surge chamber of a pump.

The leveling of the employees' efforts and the efficiency resulting therefrom further is enhanced by the manner in which the order-cashier booths and loading platforms are associated. For instance, it will be noted that the loading platform 106 has three lanes affiliated therewith, all of these lanes converging from a wide driveway at the booths to a narrow driveway at the platform. Similarly, the loading platform 108 has affiliated therewith two lanes which converge from a wide driveway at the booths to a narrow driveway at the loading platform. By having a plurality of booths associated with each of these two loading platforms greater efficiency is obtained since, if, for instance, a very large order is being given at one of the booths, the employee at the loading platform instead of having to stand idle is kept busy by the orders passing through the other booths associated with the same loading platform.

It will be recalled that the automobile driveway 74 and its affiliated order-cashier booth was referred to hereinabove as the "express" driveway. By having a long automobile driveway between the express-order-cashier booth and the express order platform, the assembly of a plurality of orders may be deferred until sufficient items have accumulated to efficiently use an employee's time as he fills all of these orders simultaneously while the several vehicles for which these orders were selected are lined up in the driveway 74.

Another advantage of the long automobile driveways is that they prevent confusion and congestion by defining definite routes from the order-cashier booths to the loading platforms and thence to the exit. These routes together with the narrowing of the driveways from the booths to the platform insures that the vehicles will be lined up before each platform in the same sequence in which the orders are taken at the associated booths so that there will be no confusion in the delivery of merchandise at the loading platforms. In other words, as a customer completes his transaction at the booth and receives his identifying number he will take a place in line in the automobile driveway which sequentially corresponds to his number and will maintain this sequence until he receives his merchandise.

It will be noted that a shopper to all intents and purposes makes a closed circuit from the entrance to the exit, and in this circuit he is guided in order past a display section, an order-cashier booth, a long path, and then a building containing the merchandise and loading platforms.

It thus will be seen that I have provided a shopping establishment which achieves all the objects of my invention and is well adapted to meet the conditions of practical use.

As various possible embodiments might be made of the above invention, and as various changes might be made in the embodiment above set forth, it is to be understood that all matter herein described or shown in the accompanying drawings, is to be interpreted as illustrative and not in a limiting sense.

Having thus described my invention, I claim as new and desire to secure by Letters Patent:

A shopping establishment comprising an area of land, an enclosure bounding said area, an entrance in said enclosure, a plurality of order-cashier stations within said area, an automobile driveway connecting said entrance and said stations and being of such length as to provide space for a multiplicity of automobiles, an order delivery building within said area, intelligence communication means between said stations and said building, said building having a plurality of loading platforms, driveways connecting said stations and said building, each of said last mentioned driveways connecting one of said stations and only one of said platforms, each of said platforms being connected by one of said last mentioned driveways with at least one of said stations, one of said driveways connecting at least two of said order cashier stations with one of said platforms, said driveway narrowing from said stations to the last mentioned one of said platforms, said last mentioned driveways being of sufficient length to provide space for a multiplicity of automobiles travelling from station to platform, storage means for vendible articles at said building, an exit in said enclosure and a driveway connecting said building and said exit, the area of the entrance-to-station driveway being substantially exclusive of the area of all of the other of said driveways and the area of the station-to-building driveways being substantially exclusive of the area of the building-to-exit driveway thus permitting orderly automobile traffic.

EDWARD A. POOL.

References Cited in the file of this patent
UNITED STATES PATENTS

| Number | Name | Date |
|---|---|---|
| 1,717,123 | Sharp | June 11, 1929 |
| 1,861,671 | Webb | June 7, 1932 |
| 2,405,294 | Delucchi | Aug. 6, 1946 |